United States Patent
Marshall et al.

(10) Patent No.: US 6,490,756 B2
(45) Date of Patent: Dec. 10, 2002

(54) BLOWER HAVING FAN ORIENTED PERPENDICULAR TO DISCHARGE NOZZLE

(75) Inventors: James D. Marshall, Mallorytown (CA); Micheal A. Milligan, Gananoque (CA); Patrick Wade Mooney, Brockville (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/844,657

(22) Filed: Apr. 27, 2001

(65) Prior Publication Data

US 2002/0157211 A1 Oct. 31, 2002

(51) Int. Cl.[7] .................................................. A47L 5/14
(52) U.S. Cl. ............................. 15/405; 15/344; 15/412
(58) Field of Search .......................... 15/326, 344, 405, 15/412

(56) References Cited

U.S. PATENT DOCUMENTS

| | | | | |
|---|---|---|---|---|
| 4,120,616 A | * | 10/1978 | Dwyer et al. | 15/326 |
| 4,213,224 A | * | 7/1980 | Miller | 15/344 |
| 4,325,163 A | * | 4/1982 | Mattson et al. | 15/405 |
| 4,644,606 A | * | 2/1987 | Luerken et al. | 15/405 |
| 4,799,287 A | * | 1/1989 | Belanger et al. | 15/405 |
| 4,945,604 A | * | 8/1990 | Miner et al. | 15/344 |
| 5,638,574 A | * | 6/1997 | Haupt et al. | 15/405 |
| 6,141,824 A | * | 11/2000 | Fujiwara et al. | 15/405 |
| 6,305,048 B1 | * | 10/2001 | Salisian | 15/326 |

* cited by examiner

*Primary Examiner*—Theresa T. Snider
(74) *Attorney, Agent, or Firm*—Harness, Dickey & Pierce, P.L.C.

(57) ABSTRACT

A blower having a fan mounted perpendicularly relative to an airflow discharge port. The fan is disposed within a volute formed in the housing at a rear area of the housing. This places the volute slightly behind the user's leg or hip when the blower is suspended or being held by a user along one side of the user's body. This significantly increases the ergonomics, efficiency and comfort of the blower by allowing the blower to rest more comfortably along the user's side without interference from the volute portion of the housing. This also allows the motor to be located directly underneath the handle of the housing to provide a better balance and feel to the housing when the user is holding onto the blower via the handle.

14 Claims, 2 Drawing Sheets

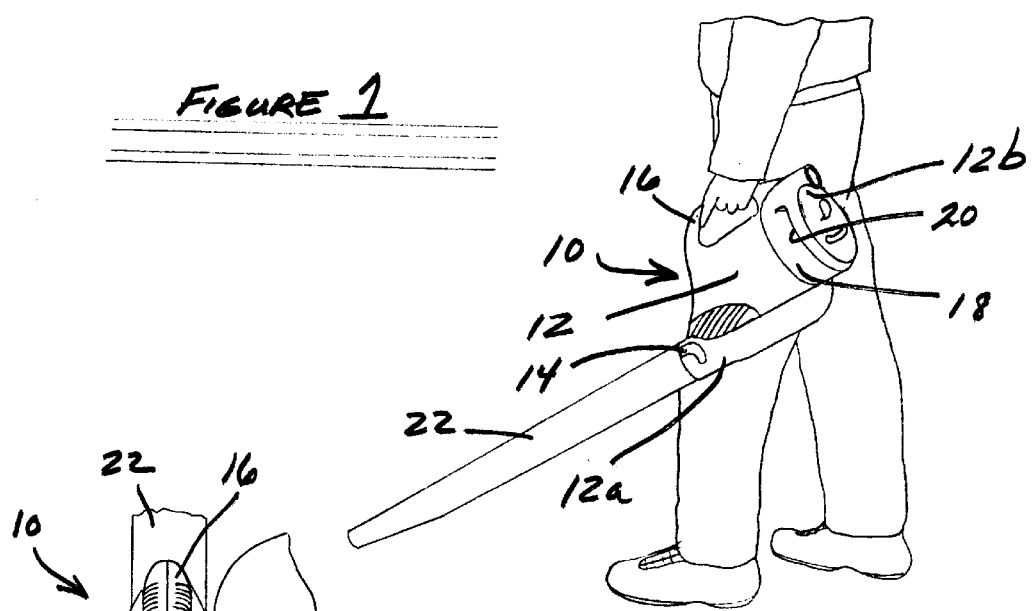
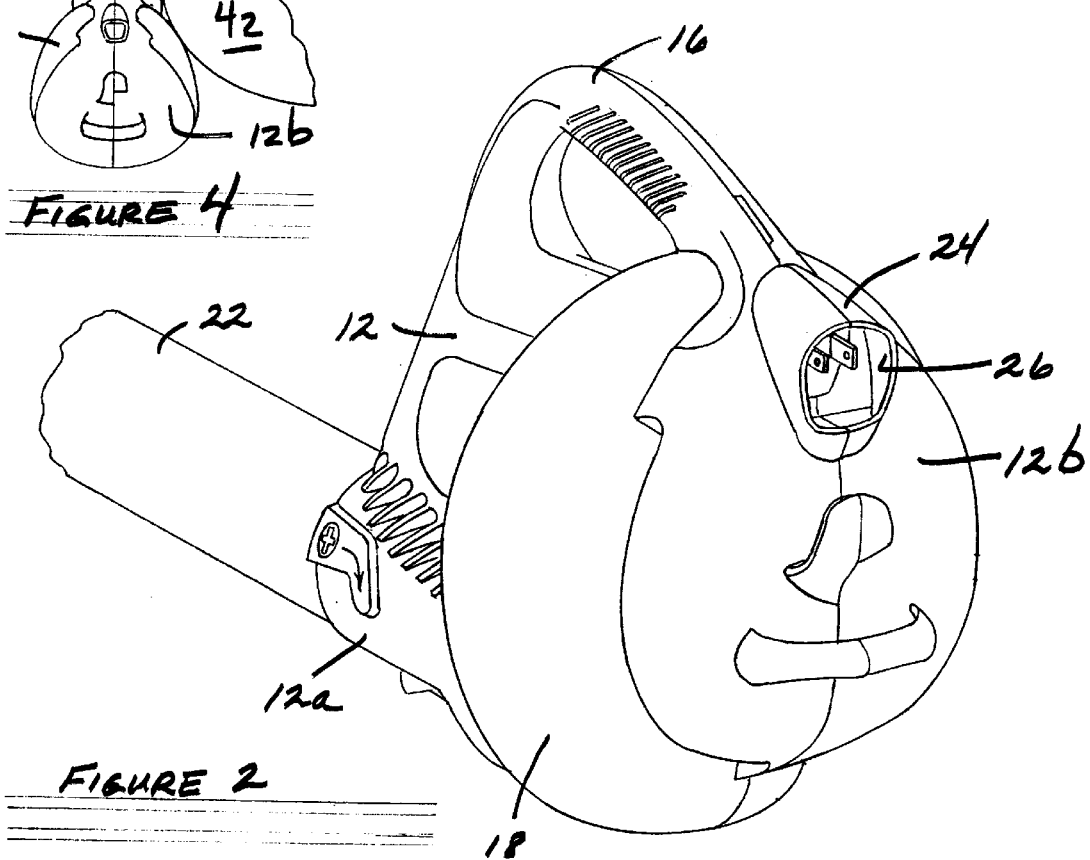

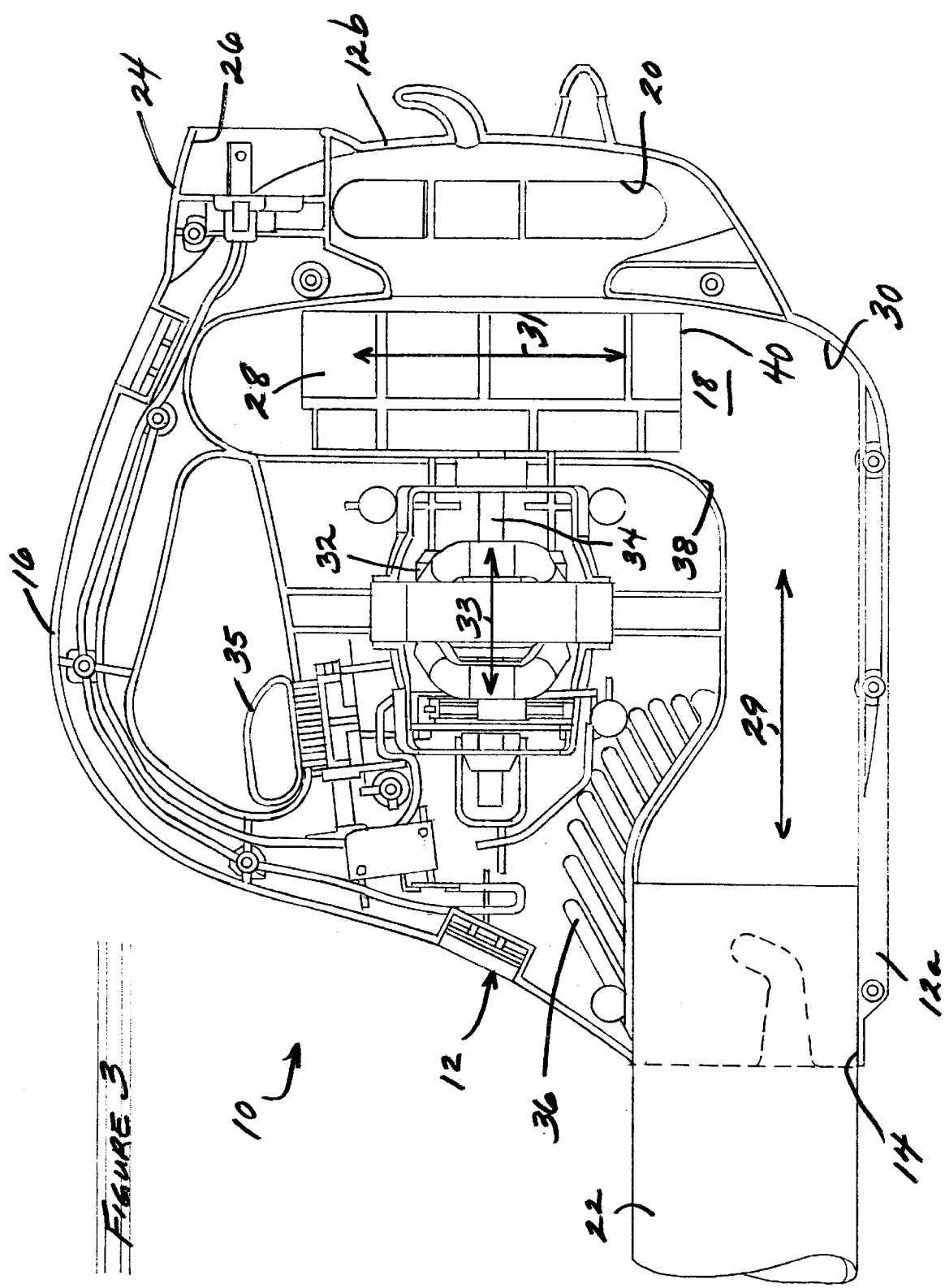

BLOWER HAVING FAN ORIENTED PERPENDICULAR TO DISCHARGE NOZZLE

FIELD OF THE INVENTION

The present invention relates to blowers for blowing debris and vegetation, and more particularly to a blower having a fan, a motor and a volute airflow passage arranged within a housing of the blower to enhance the ergonomics of the blower.

BACKGROUND OF THE INVENTION

Blowers are used in a variety of applications to blow dirt and debris, vegetation clippings, leaves and other like matter. Such blowers are often either carried with one hand at the user's side or either on the user's back via a backpack style harness, or from the user's side via a shoulder strap attached to the housing of the blower.

When carrying a blower at one side, such as with one hand or with a shoulder strap, previously developed blowers have often proved to be uncomfortable to use. This is because previously developed blowers have included an impeller or fan which is disposed along a generally horizontal plane when the blower is hanging along one side of the user. This necessitates forming a protrusion (i.e., a volute) in the housing to accommodate the fan and direct its airflow output toward a discharge port. The protrusion, however, rests against the user's hip or leg when the user is operating the blower with the blower at his/her side. From an ergonomic standpoint, this is undesirable because of the discomfort that the user may experience because of the protrusion in the housing of the blower resting against his/her leg or hip. Also, as the user moves about, the protrusion on the housing may also cause the blower to bounce slightly against the user's leg and/or hip, thus resulting in heightened discomfort.

It would therefore be highly desirable to provide a blower having its fan arranged in such a manner within the housing of the blower such that the blower can be supported along one side of the user, such as alongside the leg or hip, more comfortably as the user moves about while using the blower. It would also be desirable to provide such a blower where the external dimensions of the blower are not increased significantly by reorientating various components within the blower housing to provide the improved ergonomic operation.

SUMMARY OF THE INVENTION

The present invention relates to a blower having a fan disposed within a housing of the blower generally perpendicular to an airflow discharge port of the blower. The fan is positioned within a volute, wherein the volute forms a protrusion on the housing. The fan is further located at a rear portion of the housing so that the blower can be held at the user's side via a shoulder strap or carried by a handle on the housing without the volute interfering with the user's leg or hip. By positioning the fan and volute at the rear of the housing, the ergonomics of the blower are significantly enhanced. The rearward positioning of the fan also allows for a more compact layout by making use of the space underneath the motor for the volute transition area. A further advantage is the angle at which the airflow is discharged from the housing when the blower is supported behind the user against the user's back and used with a flexible discharge wand. In this position, the rearward location of the volute and the transition of the volute to the airflow discharge port aids in the comfort of using the blower and results in a more forwardly directed airflow discharge into the flexible wand.

In the preferred embodiments the blower is driven by a motor, the axis of which is disposed generally parallel to the longitudinal axis (or plane) of the airflow discharge port. The motor is further disposed underneath the handle portion of the housing. Thus, this provides a well balanced "feel" to the blower when the user is holding the blower at one side of his/her body.

The airflow passage between the volute and the airflow discharge port further includes a wall portion which protrudes into the airflow path, and thus obstructs the line of sight path between the discharge port and a peripheral edge of the fan. Obstructing the line of sight between the peripheral edge of the fan and the airflow discharge port helps to reduce the noise generated by the blower.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a blower in accordance with a preferred embodiment of the present invention showing the blower being held with one hand along the side of a user;

FIG. 2 is a rear view of the blower of FIG. 1;

FIG. 3 is a side partial cross sectional view of the housing showing the motor, fan, volute and airflow discharge port; and FIG. 4 is a plan view of the blower resting against the side of the user.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, there is shown a blower 10 in accordance with a preferred embodiment of the present invention. The blower 10 generally comprises a housing 12 having an airflow discharge port 14 at a forward housing area 12a, 2a, a handle 16, a volute portion 18 at a rearward housing area 12b, an airflow intake slots 20 for drawing air into the blower, and a wand assembly 22 coupled to the airflow discharge port 14. The blower 10 may be held with one hand at the user's side, as shown, or suspended via a shoulder strap along the user's side or behind the user.

Referring to FIG. 2, the blower 10 includes an AC power receptacle 24 disposed within a molded shroud 26. It will be appreciated, however, that the blower 10 could be readily adapted for use with a battery, and thus form a cordless blower, without departing from the spirit of the appended claims.

Referring now to FIG. 3, the layout and orientation of the internal components of the blower 10 will be described. It is a principal advantage that the blower 10 incorporates a fan or impeller 28 which is disposed within a plane, represented by arrow 31, perpendicularly to a longitudinal axis 29 extending along the airflow discharge port 14. The fan 28 comprises a radial flow fan which resides within the volute 18 and draws in air through the slots 20 in the housing 12. The fan 28 is disposed within the volute 18 such that the radial airflow output of the fan is directed over a substantially 90° bend 30 in the volute 18 and thereafter out through the airflow discharge port 14. An electric motor 32 is supported within the housing 12 forwardly of the fan 28. It will be noted that a longitudinal motor axis 33 of the motor 32 is thus disposed parallel to longitudinal axis 29.

To be able to drive the fan 28 with the fan disposed in a vertical orientation (i.e., perpendicular to longitudinal axis 29) as shown in FIG. 3, the motor 32 is disposed in a generally horizontal orientation (i.e., with the longitudinal axis 33 parallel to axis 29) within the housing 12 with its output shaft 34 coupled to the fan 28. A user actuatable switch 35 is operatively coupled to the motor 32 for turning the motor 32 on and off. This mounting of the fan 28 is in contrast to many previously developed blowers, which have the fan mounted in a horizontal orientation (i.e., parallel to axis 29) within the housing, and wherein a vertically mounted motor drives the horizontally mounted fan.

It is a further advantage of the placement of the fan 28 and the volute 18 of the blower 10 that the motor 32 can still be mounted directly underneath and in-line with the handle 16 of the housing 12. By mounting the motor 32 directly underneath the handle 16, the overall balance of the blower 10 can be maintained. A plurality of vents 36 formed in the housing 12 further help to allow air to circulate within the interior area of the housing 12 and around the motor 32 to thus help cool the motor.

The housing 12 also provides a noise reduction benefit by forming the bend 30 of the volute 18 such that it protrudes below a peripheral edge 40 of the fan 28. By forming the 90° bend 30 such that it impedes the line-of-sight along axis 29 to the peripheral edge 40 of the fan 28, a significant degree of noise attenuation is achieved.

By placing the fan 28 at rear area 12b of the housing 12, as shown in FIGS. 1 and 4, the volute 18 associated with the fan 28 will also be disposed at the rear housing area. Thus, the volute 18 will be slightly behind the user's leg or hip 42 (FIG. 4) when the blower 10 is being held or suspended from one side of the user. This produces a more stable feeling of the blower. This also adds significantly to the comfort and convenience in using the blower 10 because the volute 18, which forms a protrusion on the housing 12, will not rub or bounce off the user's leg or hip while the blower 10 is being held or suspended along the user's side. Thus, the rearward position of the volute 18 of the blower 10 provides a significant added degree of comfort to the user and also reduces user fatigue when it is necessary to operate the blower 10 for extended periods of time. Locating the fan 28 at the rear housing area also allows for a more compact layout, in part due to the ability to take advantage of the area under the motor 32 the airflow transition from the volute 18 to the airflow discharge port 14

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A blower comprising:
   a housing having a forward portion and a rear portion, said forward portion having an airflow discharge port;
   an electric motor disposed within said housing, said electric motor having its longitudinal axis disposed generally parallel to a longitudinal axis of said airflow discharge port;
   a fan driven by an output shaft of said motor and disposed within said housing at said rear portion of said housing generally orthogonal to said longitudinal axis of said airflow discharge port; and
   a volute airflow channel formed in said housing adjacent said motor at said rear portion of said housing for directing airflow generated by said fan to said discharge port.

2. The blower of claim 1, wherein said volute further comprises a substantially 90 degree bend for directing said airflow toward said airflow discharge port.

3. The blower of claim 2, wherein said 90 degree bend is formed to block line-of-sight communication between said airflow discharge port and a peripheral edge of said fan, to thereby reduce noise generated by said blower.

4. The blower of claim 1, wherein said housing includes a handle; and wherein said handle is located vertically over said motor.

5. A blower comprising:
   a housing having a forward portion and a rear portion, said forward portion having an airflow discharge port;
   an electric motor disposed within said housing, said electric motor having its longitudinal axis disposed generally parallel to a longitudinal axis of said airflow discharge port;
   a fan driven by an output shaft of said motor and disposed within said housing at said rear portion of said housing generally orthogonal to said longitudinal axis of said airflow discharge port;
   a volute airflow channel formed in said housing adjacent said motor at said rear portion of said housing for directing airflow generated by said fan to said airflow discharge port;
   said volute airflow channel including a substantially 90 degree bend substantially impeding line-of-sight communication to a peripheral edge of said fan.

6. The blower of claim 5, wherein said housing further comprises a handle graspable by a user, said handle being located vertically over said motor.

7. A blower comprising:
   a housing having a forward portion and a rear portion, said forward portion having an airflow discharge port;
   an electric motor disposed within said housing, said electric motor having its longitudinal axis disposed generally parallel to a longitudinal axis of said airflow discharge port;
   a fan driven by an output shaft of said motor and disposed within said housing at said rear portion of said housing generally orthogonally to said longitudinal axis of said airflow discharge port;
   a volute airflow channel formed in said housing adjacent said motor at said rear portion of said housing for directing airflow generated by said fan to said airflow discharge port;
   said volute airflow channel being formed within said housing so as to form a bulge protruding from said housing at said rear portion to thus eliminate interference with hip and leg areas of a user when said blower is carried by a user and rests along one side of the user's body, said bulge further helping to cradle said housing against said user's body.

8. The blower of claim 7, wherein said volute includes a substantially 90 degree bend communicating with said airflow discharge port and a peripheral area of said fan.

9. The blower of claim 8, wherein said 90 degree bend blocks line-of-sight communication between said airflow discharge port and a peripheral edge of said fan to thereby provide a noise reduction function for said blower.

10. The blower of claim 7, wherein said housing further includes a handle graspable by said user, said handle being located substantially directly vertically over said motor and forwardly of said volute.

11. A blower comprising:

a housing having an airflow discharge port and a volute formed in said housing generally perpendicularly to said airflow discharge port and at a rear portion of said housing;

a radial airflow fan disposed within said housing to generate an airflow into said volute, said fan being disposed generally perpendicularly to said airflow discharge port; and a motor disposed within said housing for driving said fan, said motor being oriented such that a longitudinal motor axis thereof is generally parallel to a longitudinal axis extending along said airflow discharge port.

12. The blower of claim 11, wherein said volute includes a 90 degree bend which blocks a line-of-sight between said airflow discharge port and a peripheral edge of said fan, to thereby help reduce noise generated by said blower during operation thereof.

13. A blower comprising:

a housing having an airflow discharge port, the airflow discharge port having a longitudinal axis;

a volute formed in said housing and disposed within a plane which extends generally perpendicularly to said longitudinal axis of said airflow discharge port;

a radial airflow fan disposed within said housing to generate an airflow into said volute, said fan being disposed generally perpendicularly to said airflow discharge port;

a motor for driving said fan;

wherein said volute includes a substantially 90 degree bend for directing said airflow generated by said fan into said airflow discharge port; and wherein said volute is disposed at a rear portion of said housing so as not to interfere with a user's leg or hip when said blower is positioned alongside said user during operation thereof.

14. The blower of claim 13, wherein said 90 degree bend of said volute protrudes so as to block a line-of-sight through said airflow discharge port to a peripheral edge of said fan, to thereby attenuate noise generated by said blower during operation thereof.

* * * * *